United States Patent [19]
Romo

[11] Patent Number: 5,520,054
[45] Date of Patent: May 28, 1996

[54] INCREASED WALL THICKNESS FOR ROBUST BOND FOR MICROMACHINED SENSOR

[75] Inventor: Mark G. Romo, Eden Prairie, Minn.

[73] Assignee: Rosemount Inc., Eden Prairie, Minn.

[21] Appl. No.: 219,398

[22] Filed: Mar. 29, 1994

[51] Int. Cl.⁶ ............................. G01L 7/08; G01L 13/02
[52] U.S. Cl. ................................. 73/715; 73/716
[58] Field of Search ...................... 73/715–720, 721–728

[56] References Cited

U.S. PATENT DOCUMENTS

| | | | |
|---|---|---|---|
| 4,600,912 | 7/1986 | Marks et al. | 338/42 |
| 4,773,269 | 9/1988 | Knecht et al. | 73/721 X |
| 4,800,758 | 1/1989 | Knecht et al. | 73/727 |
| 4,823,230 | 4/1989 | Tiemann | 361/283 |
| 5,062,302 | 11/1991 | Petersen et al. | 73/754 |
| 5,257,547 | 11/1993 | Boyer | 73/721 |
| 5,375,473 | 12/1994 | Ikeda et al. | 73/720 |

FOREIGN PATENT DOCUMENTS

| | | |
|---|---|---|
| 3-282342 | 12/1991 | Japan . |
| 5-142074 | 6/1993 | Japan . |
| 5-60635 | 12/1993 | Japan . |
| 2253739 | 9/1992 | United Kingdom . |

OTHER PUBLICATIONS

David Broek, "Elementary Engineering Fracture Mechanics", 1986, *Martinus Nijhoff Publishers*, pp. 3–32.

W. P. Maszara, "Silicon–On–Insulator By Wafer Bonding: A Review", Jan. 1991, *J. Electrochem. Soc.*, vol. 138, No. 1, pp. 341–347.

W. H. Ko, J. T. Suminto and G. J. Yeh, "Bonding Techniques For Microsensors", 1985, *Elsevier Science Publishers*, pp. 198–207.

M. Alavi, S. Buttgenbach, A. Schumacher and H.–J. Wagner, "Fabrication Of Microchannels By Laser Machining And Anisotropic Etching Of Silicon", 1992, *Elsevier Sequoia*, pp. 299–302.

Jacob Fraden, "Piezoresistive Sensors", 1993, *API Handbook of Modern Sensors*, pp. 377–383.

Yaoling Wang, Litian Liu, Xinyu Zheng and Zhijian Li, "A Novel Pressure Sensor Structure For Integrated Sensors", 1990, *Elsevier Sequoia*, pp. 62–64.

Kurt Petersen, Phillip Barth, John Poydock, Joe Brown, Joseph Mallon, Jr., and Janusz Bryzek, "Silicon Fusion Bonding For Pressure Sensors", 1988, *IEEE Press*, pp. 209–212.

Lee Christel, Kurt Petersen, Phillip Barth, Farzad Pourahmadi, Joseph Mallon, Jr., and Janusz Bryzek, "Single–crystal Silicon Pressure Sensors With 500× Overpressure Protection", 1990, *Elsevier Sequoia*, pp. 84–88.

Farzad Pourahmadi, Phillip Barth and Kurt Petersen, "Modeling Of Thermal And Mechanical Stresses In Silicon Microstructures", 1990, *Elsevier Sequoia*, pp. 850–855.

J. Binder, G. Ehrler, K. Heimer, B. Krisch, M. Poppinger, "Silicon Pressure Sensors For The 2 kPa To 40 MPa Range", 1984, *Springer–Verlag*, pp. 294–302.

(List continued on next page.)

*Primary Examiner*—Richard Chilcot
*Assistant Examiner*—Joseph L. Felber
*Attorney, Agent, or Firm*—Westman, Champlin & Kelly

[57] ABSTRACT

A micromachined device is described receiving a pressurizable fluid has a plurality of layers bonded together along at least one bond interface, the bond interface having a terminus bordering the pressurizable fluid. In a vicinity of at least one bond interface at least one layer has a shape that reduces a stress magnitude near the bond terminus. In a preferred embodiment a width of at least one layer increases toward the bond interface, to increase the pressure at which the device can operate without fracturing. In another embodiment, both layers bordering the bond interface have widths in the vicinity of the bond interface that increase toward the bond interface. Alternately, the layers have walls shaped such that, for a reference line perpendicular to the bond interface and passing through an end of the bond interface bordering the cavity, the cavity protrudes between the reference line and at least one of the walls.

23 Claims, 4 Drawing Sheets

OTHER PUBLICATIONS

M. Alavi, S. Buttgenbach, A. Schumacher, H.-J. Wagner, "Laser Machining Of Silicon For Fabrication Of New Microstructures", 1991, *IEEE Press*, pp. 512–515.

Farzad Pourahmadi, Dale Gee, Kurt Petersen, "The Effect Of Corner Radius Of Curvature On The Mechanical Strength Of Micromachined Single–Crystal Silicon Structures", 1991, *IEEE Press*, pp. 197–200.

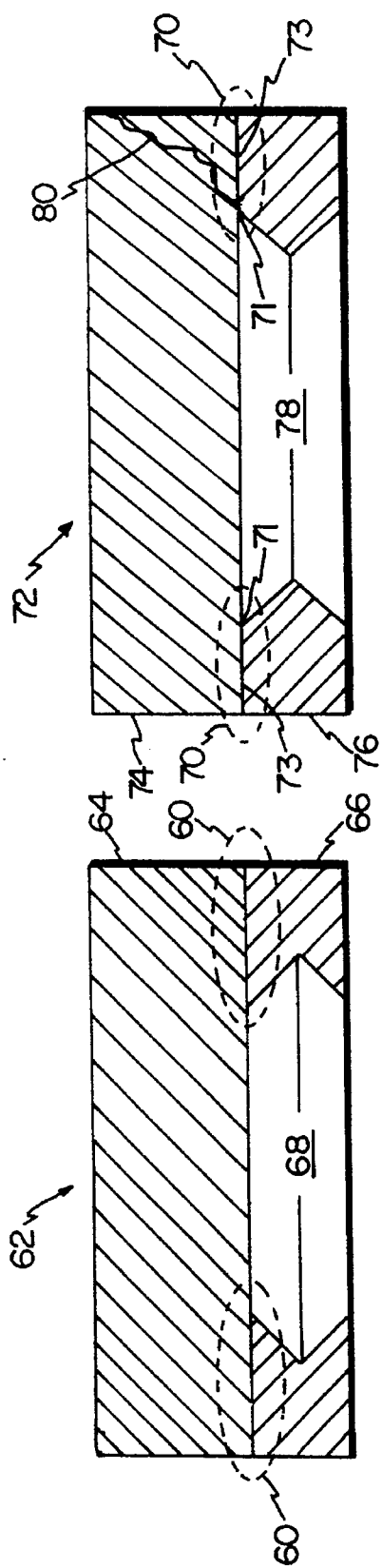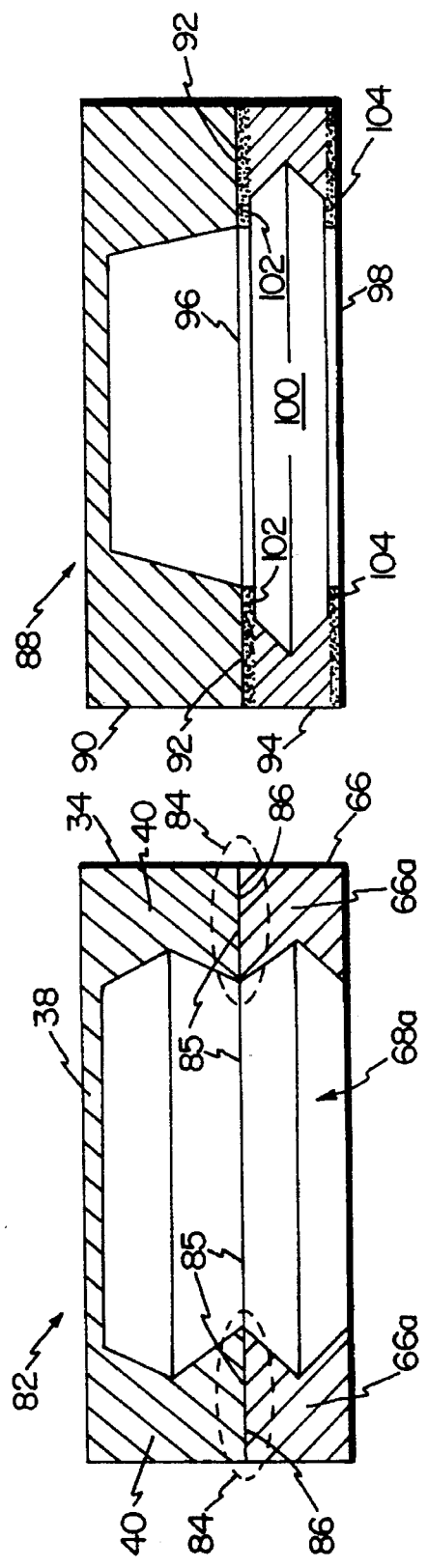

5,520,054

INCREASED WALL THICKNESS FOR ROBUST BOND FOR MICROMACHINED SENSOR

BACKGROUND OF THE INVENTION

The present invention relates to devices constructed from multiple layers of material which are bonded together, and which devices are subject to bursting forces from an internal pressurized fluid. More particularly, the invention finds application in the construction of pressure sensors, particularly those fabricated with brittle materials using micromachining techniques.

As used herein, "micromachined" and derivative words refer to an article which can be fabricated at least in pan using solid state processing techniques such as photolithography, chemical and plasma etching, chemical vapor deposition, plasma deposition, and similar processes known to those skilled in the art.

In FIG. 1, a pressure P to be measured acts on a prior art pressure transducer 10 which includes an upper silicon part 12 and a substrate 14. Part 12 is shaped to define a diaphragm 16 therein and an inner cavity 18. Formed in or near diaphragm 16 are piezoresistive gauge resistors 22,24, at least one of which has a resistance value that varies with the amount of strain in diaphragm 16, which strain is a function of pressure P. A measurement circuit, not shown, couples to resistors 22,24 and provides an output as a function of pressure P.

A difficulty with prior art devices such as that of FIG. 1 occurs if they are subjected to high tensile stresses from pressurized fluids within the device. For example, if transducer 10 is used in a differential pressure application, cavity 18 can be charged with a highly pressurized fluid through orifice 20. If an internal pressure P' greatly exceeds outer pressure P, the stress magnitude 26 along an interface 28 between part 12 and substrate 14 increases rapidly toward a terminus 30 of interface 28 (see FIG. 2), due to the shape of layers 12,14 in the vicinity of interface 28. If a preexisting microscopic crack or other flaw 29 is present at terminus 30, a stress intensity factor associated with such crack or flaw 29 will be relatively high.

In the art of mechanical engineering, the "stress" at any given point in a structure is the net force acting on an arbitrarily small area at the point divided by such area. Stress is a vector quantity, measured in units of Pascals (1 Pa=1 N/m$^2$). In contrast, "stress intensity factor" is a scalar quantity used in the analysis of an existing crack front in a mechanical structure, having units of Pa•$\sqrt{m}$ (or, equivalently, N/m$^{3/2}$). If the stress intensity factor exceeds a critical value, referred to as the "fracture toughness" of a material, the crack front will grow, resulting in a fracture in the material. The fracture toughness for silicon, for example, is conservatively estimated at about 7×10$^5$ Pa•$\sqrt{m}$. The reader is referred to *Elementary Engineering Fracture Mechanics* by David Broek, published 1986, for further background discussion of stress intensity factor and fracture toughness.

BRIEF SUMMARY OF THE INVENTION

The present invention shapes at least one of the layers proximate the interface so as to reduce the stress magnitude adjacent the bond terminus, thereby to reduce the stress intensity factor of any cracks at the bond terminus, reducing the chance of fractures and allowing the device to withstand significantly higher internal pressures. According to one aspect of the invention, a micromachined device is adapted to receive a pressurized fluid and includes a first and second layer bonded together along a bond interface. To increase the fluid pressure the device can receive without fracturing, a width of the second layer increases toward the bond interface, in a vicinity of the bond interface.

In a preferred embodiment, the micromachined device has a plurality of layers bonded together along at least one bond interface. The device also has a cavity therein. For each bond interface having a terminus bordering the cavity, two of the layers adjacent the bond interface have, respectively, first and second wall faces in the vicinity of the bond interface. The first and second wall faces have a shape such that, for a reference line perpendicular to the bond interface and passing through the bond interface terminus, the cavity protrudes between the reference line and at least one of the first and second wall faces.

BRIEF DESCRIPTION OF THE DRAWINGS

FIG. 6 is a sectional view of an arrangement used to test a bond of the present invention;

FIG. 7 is a sectional view of an arrangement used to test a conventional bond;

FIG. 8 is a sectional view of another embodiment of a pressure transducer in accordance with the invention;

FIG. 9 is a sectional view of another embodiment of a pressure transducer in accordance with the invention.

For convenience, items in the figures having the same reference symbol are the same or serve the same or a similar function.

DETAILED DESCRIPTION OF THE PREFERRED EMBODIMENTS

Figure 1:
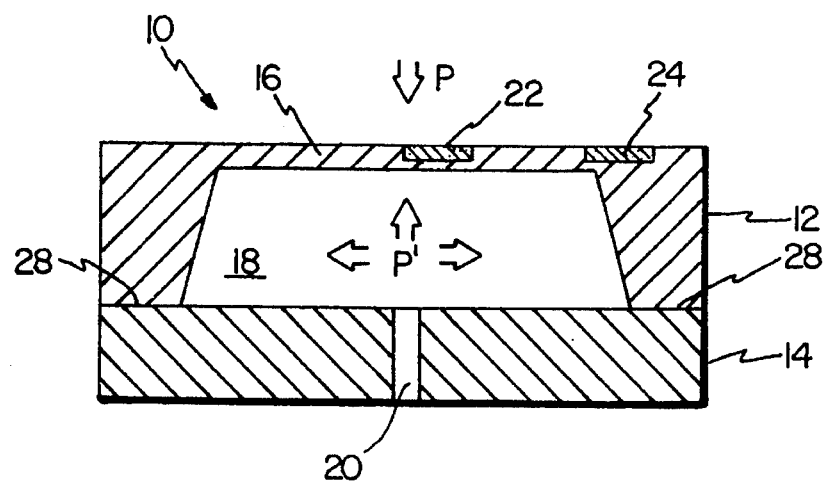
FIG. 1 is a cross-sectional view of a PRIOR ART pressure transducer.
Figure 3:
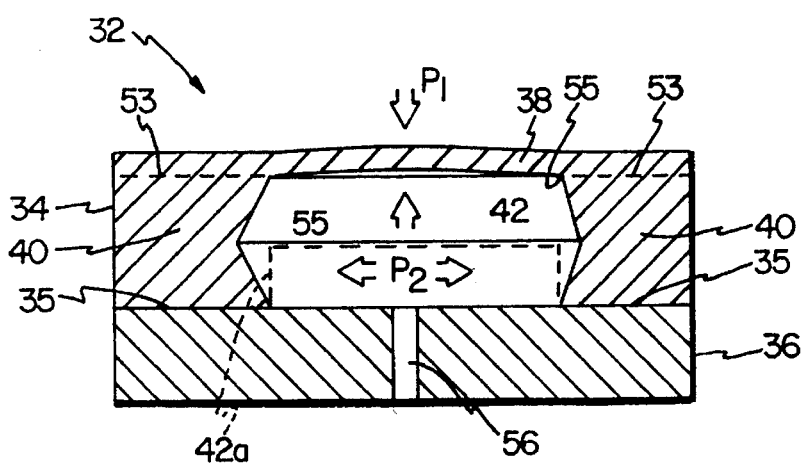
FIG. 3 is a sectional view of a pressure transducer in accordance with the invention.

In FIG. 3, a pressure transducer 32 includes a first layer 34 bonded to a second layer 36 along a bond interface 35. Transducer 32 measures a difference between an external pressure $P_1$ and an internal pressure $P_2$, which pressures are preferably communicated to transducer 32 by silicone oil or other substantially incompressible liquids, or by other fluids such as nitrogen or air. Alternately, $P_1$ can be a vacuum. Conventional sensing means, not shown, is provided on, in, or near a diaphragm 38 of layer 34 to provide a transducer output indicative of the pressure difference. Such sensing means can comprise one or more diffused piezoresistive gauge resistors as shown in FIG. 1, together with bridge circuitry coupled thereto, amplification, and temperature correction. Alternately, the sensing means can comprise a conductive layer disposed on diaphragm 38 which, together with another conductor held proximate thereto, forms a pressure-sensitive variable capacitor. If diaphragm 38 is itself electrically conductive, the conductive layer disposed thereon can be eliminated. As another alternative the sensing means can comprise a reflective surface on diaphragm 38 together with known systems for measuring displacement optically, such as those utilizing Fabry-Perot techniques.

Figure 2:
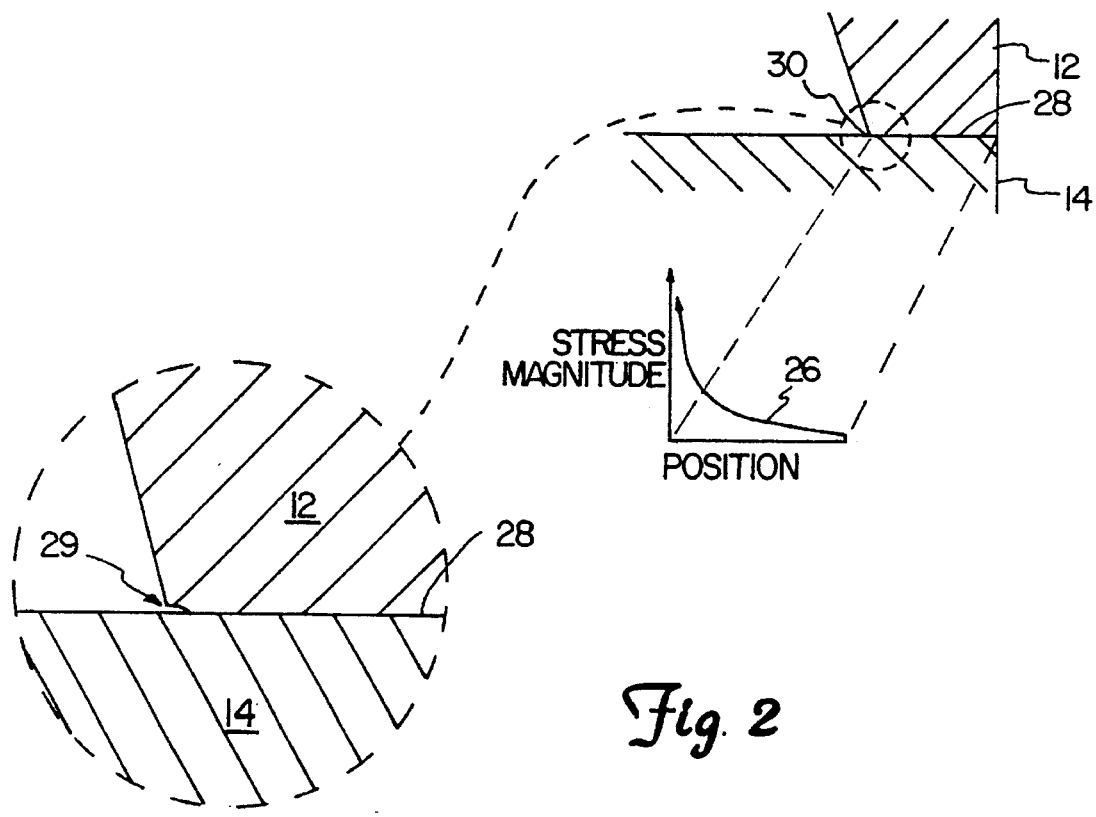
FIG. 2 shows details of the pressure transducer of FIG. 1, enlarged, where pressure P' is greater than pressure P.

The invention is used to advantage in applications where pressure $P_2$ can greatly exceed pressure $P_1$, such that transducer 32 experiences bursting forces tending to fracture transducer 32 at vulnerable sites. As was seen in connection with FIGS. 1 and 2, a vulnerable site on a transducer having a pressurized inner cavity is a terminus of a bond that borders the cavity. It has been observed that edges of anodic bonds, fusion bonds, and other bonds used in solid state processing of brittle materials tend to have microscopic cracks or flaws such as shown in FIG. 2, before any exposure to significant differential pressures. When exposed to high stresses resulting from an internal pressurized fluid, such cracks or flaws promote fractures in the device. According to the invention, layer 34 has a shape in the vicinity of bond interface 35 that reduces the stress magnitude adjacent a bond terminus 50.

Figure 4:
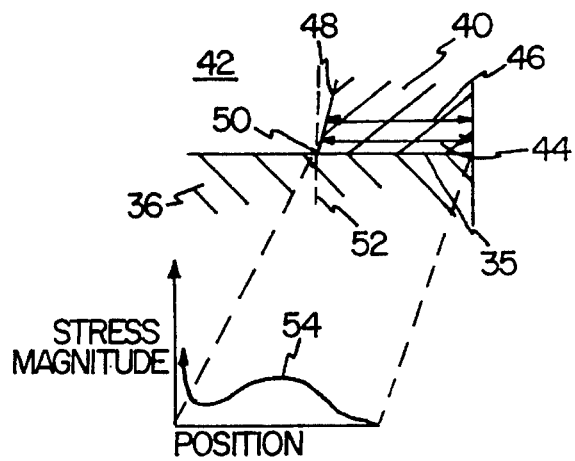
FIG. 4 shows a detail of the pressure transducer of FIG. 3.

The stress-reducing shape of layer 34 can be characterized in various ways. Wall 40 of layer 34, which surrounds pressurized cavity 42, has a width in a vicinity of bond interface 35 that increases toward bond interface 35: i.e., width 44 is greater than width 46 (see FIG. 4). A face 48 of wall 40 facing cavity 42 and proximate bond terminus 50 makes an angle of less than 90° with bond interface 35. For a line segment 52 perpendicular to bond interface 35 and passing through bond terminus 50, cavity 42 extends between such line segment 52 and wall face 48.

Where layers 34,36 are composed of brittle materials such as silicon, gallium arsenide, sapphire, ceramics, glass, or the like, and where pressure $P_2$ exceeds $P_1$, shaping layers 34,36 as shown in FIGS. 3 and 4 has the effect of reducing the stress magnitude (see curve 54) adjacent the bond terminus 50 relative to the prior art structure. The stress intensity factor for any cracks at the bond terminus is also reduced, permitting transducer 32 to withstand higher internal pressures than transducer 10, provided other vulnerable sites in transducer 32 can also withstand such pressures.

A potentially vulnerable site of transducer 32 is a corner 55 of inner cavity 42, where stress magnitudes can be very high. It has been observed that where layer 34 is a unitary part, e.g., where diaphragm 38 results solely from chemically removing portions of layer 34, corner 55 can withstand much higher pressures $P_2$ than if diaphragm 38 had been bonded to wall 40, with a resultant bond interface 53 terminating at corner 55. Hence, if layer 34 is a unitary part (as shown in FIG. 3) then the bond of FIG. 4 will permit transducer 32 to withstand higher internal pressures without fracture; but if layer 34 comprises diaphragm 38 bonded to wall 40 then the bond of FIG. 4 may or may not permit transducer 34 to withstand higher internal pressures, depending on the strength of the bond terminating at corner 55. Still, if diaphragm 38 is bonded to wall 40 along interface 53, the shape of wall 40 shown in FIG. 3 will reduce stress magnitude adjacent corner 55 relative to a joint such as that of FIG. 2.

In a preferred embodiment, layer 34 comprises silicon having orientation [100]. Cavity 42 is formed by directionally etching out cavity portion 42a using a reactive ion etch, then using an anisotropic etch such as KOH for the remainder of cavity 42. Wall face 48 then corresponds to a 111 plane in the silicon and makes an angle with bond interface 35 of approximately 55°. Angles between about 5° and 70° are believed to function satisfactorily. Layer 36 comprises silicon having orientation [100], and port 56 is formed by etching or by drilling. In a plane perpendicular to the plane of FIG. 3 and parallel to bond interface 35, port 56 can have an arbitrary shape, and cavity 42 can have a rectangular shape. Layers 34,36 preferably have thicknesses from about 0.1–2.0 millimeters. To lower the stress intensity of microcracks at terminus 50, thereby enhancing robustness of the bond between layers 34, 36, wall 40 should have a width proximate interface 35 that increases as rapidly as practicable toward interface 35; alternately, the angle between wall face 48 and interface 35 should be as small as practicable.

Bond interface 35 can be a fusion bond or an anodic bond, as known to those skilled in the art. Fusion bonds generally useable with the invention are taught by W. P. Maszara in "Silicon-On-Insulator by Wafer Bonding: A Review", J. Electrochemical Soc. (January 1991), pp. 341–347. Anodic bonds useable with the invention are taught by Ko et at. in "Bonding Techniques for Micro Sensors", in *Micromachining and Micropackaging of Transducers*, Clifford D. Fung et at. (Eds.), published 1985. Additionally, thin layers of oxides, metals, or other materials can be used between layers 34,36. Such thin layers, if composed of gold, platinum, or similar ductile materials, can in some cases deform or even alloy with the layers during processing to fill in the preexisting microscopic cracks mentioned previously at the bond interface terminus, thereby inhibiting fracture initiation and further enhancing robustness of the bond. Preferably, such thin layers have a combined thickness less than 10% of the thickness of either layer 34,36.

Figure 5:
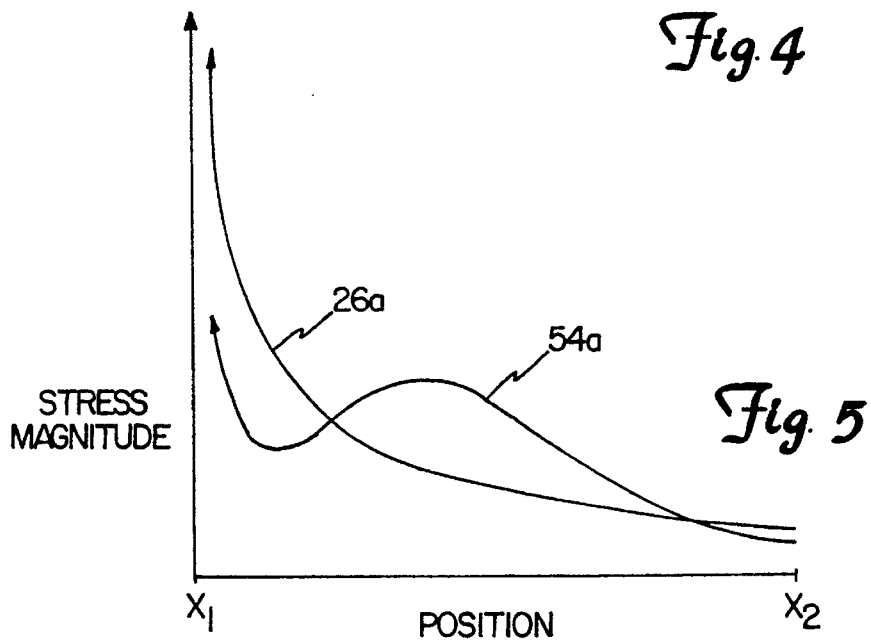
FIG. 5 is a graphical representation of stress magnitude as a function of position along a bond interface, for a PRIOR ART bond and also for a bond of the present invention.

Shown superposed in FIG. 5 are representative stress magnitude curves 26a,54a for the bonds shown generally in FIGS. 2 and 4, respectively, wherein the respective transducers are exposed to a given internal fluid pressure. In this context, and elsewhere as appropriate, it is to be understood that internal fluid pressure refers to a pressure difference between a relatively large internal fluid pressure and a smaller external fluid pressure, if any. Curves 26a,54a are shown for bonds of equal length ($X_2-X_1$) and assume equal loads (i.e., the integral of curve 26a from position $X_1$ to position $X_2$ equals the integral of curve 54a over the same limits). Position $X_1$ corresponds to the bond terminus bordering the pressurized cavity and $X_2$ corresponds to the opposite bond terminus. Both curves rise rapidly toward position $X_1$ to a stress magnitude off the scale of the graph. However, adjacent to position $X_1$, curve 54a has significantly lower stress magnitude levels than curve 26a. This reduced stress adjacent the bond terminus is achieved at the expense of higher stress levels at positions further removed from $X_1$ and intermediate $X_1$ and $X_2$. A microcrack occurring at $X_1$ has a reduced stress intensity factor in the case of a bond according to the present invention compared to the prior art bond of FIG. 2.

The structures of FIGS. 6 and 7 were tested in a high pressure environment to prove the robustness of bond 60 relative to bond 70. Structure 62 comprised a 1.27 millimeter thick silicon layer 64 fusion bonded to a 0.89 mm thick silicon layer 66 which prior to bonding had been etched to form cavity 68. Structure 72 comprised a 1.27 mm thick silicon layer 74 fusion bonded to a 0.89 mm thick silicon layer 76 which prior to bonding had been etched to yield cavity 78. In the horizontal direction, both structures 62,72 had an overall width of about 6.35 mm, cavities 68 and 78 both had a minimum width of about 2.3 mm, and both cavities 68, 78 had a maximum width of about 2.96 mm. Structures 62, 72 and cavities 68, 78 had substantially square shapes in reference planes parallel to the bond interface and perpendicular to the plane of FIGS. 6 and 7. Cavity 78 was formed by a masking step followed by simultaneously etching both sides with a solution of KOH. Cavity 68 was formed using the same steps, except that layer 66 was kept in the KOH solution for a longer time until the wall profile shown in FIG. 6 was achieved.

Samples of each structure were fabricated, cavities 68, 78 were pressurized with silicone oil, and the pressure was increased until a fracture occurred. The oil pressure at which the fracture occurred was recorded. The results are summarized in the following table:

|  | Structure 62 | Structure 72 |
| --- | --- | --- |
| Number of samples tested | 16 | 13 |
| Fail pressure - lowest | 6000 psi | 2000 psi |
| Fail pressure - average | 6700 psi | 2230 psi |

The tests show that the robustness of bond 60, measured as the internal pressure required to cause a fracture, is about three times better than that of bond 70. Inspection revealed that fractures in structure 72 resembled fracture 80 of FIG. 7, initiating at a terminus 71 of bond interface 73.

Transducer 82 of FIG. 8 is similar to structure 62, except that upper layer 64 has been replaced by layer 34 (see FIG. 3) with pressure-responsive diaphragm 38, forming an extended inner cavity 68a. It is believed that bond 84 has enhanced robustness relative to bond 60 because both wall 40 and wall 66a have a width that increases toward bond interface 86 in the vicinity of bond interface 86. Transducer 82 also comprises a thin layer 85 between layers 34,66, for adhesion, electrical isolation, or other purposes.

Transducer 88 of FIG. 9 has a unitary top layer 90 similar to layer 12 of FIG. 1. Fusion bonded to layer 90 along bond interface 92 is layer 94. Preferably, layer 94 comprises silicon and is shaped in the following manner before bonding: diffusing boron impurities into top and bottom sides 96,98 to a depth of about 0 to 5 micrometers; patterning sides 96,98 using standard photolithographic procedures and, using an isotropic etchant that attach the diffused silicon, etching sides 96,98 to a thickness of the diffused portion; etching the remainder of layer 94 using electrochemical etching, or a combination of isotropic and anisotropic etchants that attack only the non-diffused portion of layer 94, to yield cavity 100. Resulting layer 94 has a wall width that increases abruptly in stepwise fashion toward interface 92. It is believed that this abrupt change in width, and also the relative thinness of tab 102 at the terminus of bond interface 98, increases the robustness of the bond between layers 90 and 94. Tab 102 preferably has a length (i.e., the portion of the wall width along tab 102) equal to or greater than its thickness to increase tab flexibility and increase transducer robustness. As shown, layer 94 also includes tab 104 to enhance robustness of a bond between a base layer (not shown) and side 98 of layer 94. Preferably, tab 104 has a thickness and length-to-thickness ratio similar to tab 102. Tabs 102,104 surround cavity 100.

Figure 10:
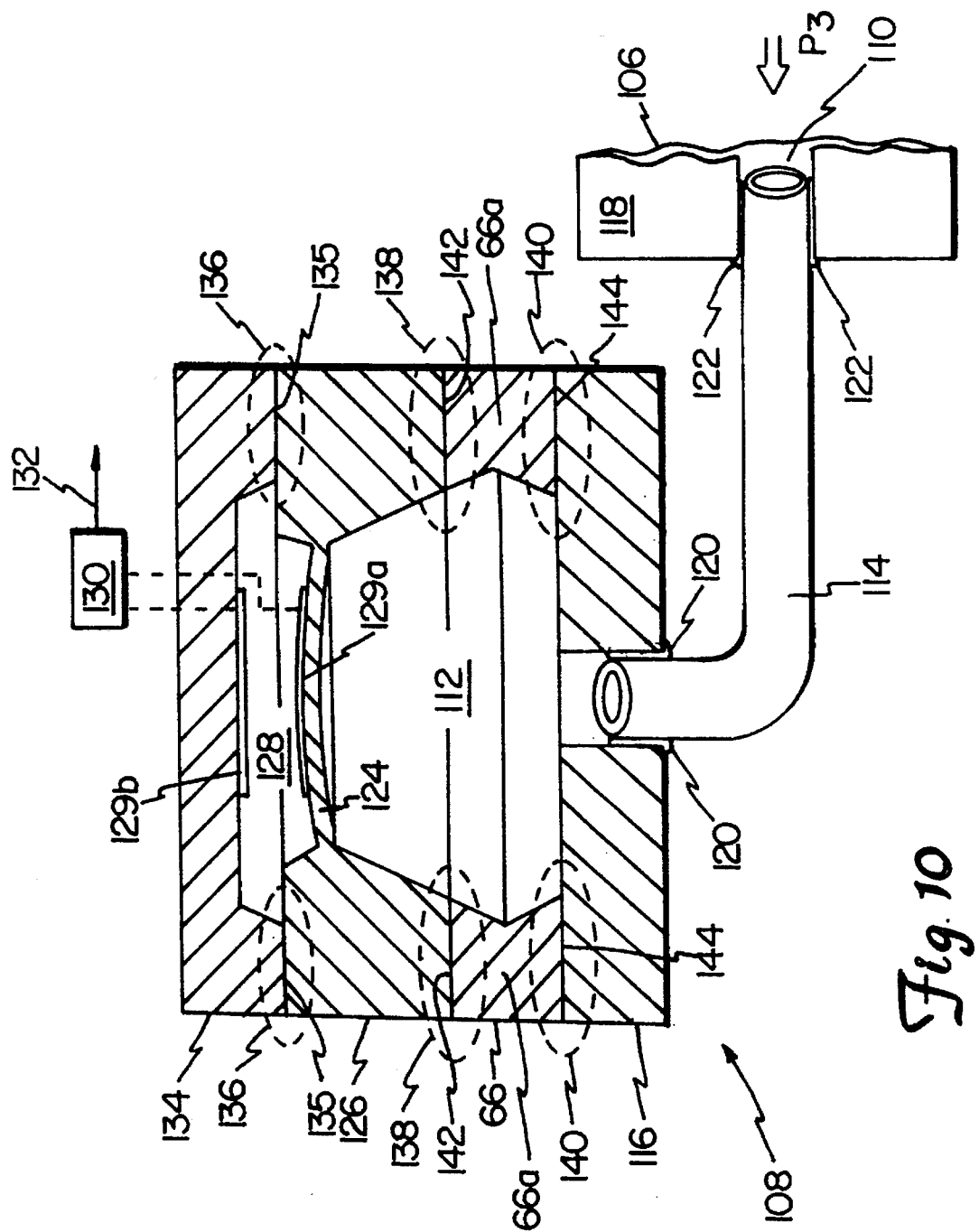
FIG. 10 is a sectional view of still another embodiment of a pressure transducer in accordance with the invention.

In FIG. 10, a process pressure $P_3$ from a solid (including powders and particulates), a liquid, or a gas acts on isolation diaphragm 106 of transducer 108. An incompressible fluid such as silicone oil fills cavity 110, cavity 112, and capillary tube 114 which sealably connects to a base layer 116 and to an isolator body 118 via solder joints 120,122, respectively. Pressure $P_3$ pressurizes the incompressible fluid. If desired, capillary tube 114 can be eliminated and body 118 can be attached to layer 116. Alternately, the solid, liquid, or gas generating $P_3$ can be provided directly to cavity 112. Transducer 108 includes a sensing diaphragm 124 as part of a unitary layer 126. Diaphragm 124, shown slightly bowed, moves as a function of a pressure difference between cavity 112 and cavity 128, and sensing means 130 couples to diaphragm 124 and provides an output 132 as a function of pressure $P_3$. Sensing means 130 can be any known means of measuring diaphragm stress or deflection, including those discussed previously. As shown, sensing means 130 couples to conductors 129a,129b and measures a capacitance therebetween.

Transducer 108 includes brittle layers 134, 126, 66, and 116, all preferably composed of silicon, and preferably fusion bonded together. Layer 66 is substantially as described in connection with FIGS. 6 and 8. Layers 134 and 126 can be fabricated using known micromachining techniques. Base layer 116 is similar to layer 36 of FIG. 3. Cavity 128 can be substantially evacuated, in which case output 132 is indicative of an absolute pressure measurement of $P_3$. Alternately, cavity 128 can be vented to an ambient atmosphere, in which case output 132 is indicative of a gauge pressure measurement of $P_3$. In either case bond 136 between layers 134 and 126 need not be a robust bond according to the invention, since cavity 128 will not experience significant pressurization and hence bond interface 135 will not experience significant tensile stresses. However, bonds 138 and 140 should be and as shown are in accordance with the invention because they border pressurized cavity 112. Accordingly, wall 66a has a width that increases in the vicinity of bond interfaces 142,144 toward bond interfaces 142,144, respectively. Wall 66a has wall faces bordering cavity 112 and in the vicinity of bond interfaces 142,144 that make an angle of less than 90° with bond interfaces 142,144, respectively. Cavity 112 extends between such wall faces and line segments drawn perpendicular to bond interfaces 142,144 and passing through a terminus of such interfaces. In transducer 108, every bond between fracturable layers that has a bond terminus bordering pressurizable cavity 112 is in accordance with the invention in order to increase the bursting pressure at which transducer 112 can operate without fracture.

Preferably, transducers 32, 82, 88, and 108 also include conventional means for protecting the measurement diaphragm itself from overpressure. Many different transducer configurations are within the broad scope of the invention. For example, layer 94 can be substituted for layer 66 in FIGS. 8 and 10. Layer 94 can be inserted between layers 34 and 36 in FIG. 3, between layers 34 and 66 in FIG. 8, between layers 126 and 66 in FIG. 10, and between layers 66 and 116 in FIG. 10. Layers 34, 90, and 126 can include tabs such as 104 at their bottom surfaces. Where a layer having a tab such as 102 or 104 is used to form a robust bond, the terminus of the bond interface should be disposed at or near the free end of the tab to take advantage of the tab's relative flexibility, thereby reducing stress magnitude adjacent the bond terminus and therefore reducing the stress intensity factor of any crack at the bond terminus. The cross-sectional views of wall shapes in FIGS. 1, 3, and 6–10 are representative of wall shapes surrounding the internal cavity.

Although the present invention has been described with reference to preferred embodiments, workers skilled in the art will recognize that changes can be made in form and detail without departing from the spirit and scope of the invention. Micromachined devices other than pressure transducers, such as temperature sensors, analytical sensors, or flow sensors, or portions thereof, can benefit from the robust bond of the present invention. The bonded layers can be composed of any material that is susceptible to fracturing.

What is claimed is:

1. A micromachined device adapted to receive a pressurized fluid, comprising:

a first layer means; and a second layer means bonded to the first layer means along a bond interface, the bond interface having a terminus;

wherein one of the first and second layer means defines a pressure sensitive diaphragm and wherein the second layer means has a cavity therein to receive the pressurized fluid and a wall with a wall face bordering the cavity, and wherein in the vicinity of the portion of the bond interface nearest the diaphragm, a vector normal to the wall face extends inwardly into the cavity and away from the plane of the bond interface.

2. The device of claim 1, wherein the second layer means has a wall width in the vicinity of the bond interface that increases toward the bond interface.

3. The device of claim 2, wherein the increase in wall width is continuous with length.

4. The device of claim 2, wherein the increase in wall width is substantially stepwise.

5. The device of claim 4, wherein the substantially stepwise increase in wall width defines a tab having a length in a direction generally parallel to the bond interface and a thickness in a direction generally normal to the bond interface, the tab length being equal to or greater than the tab thickness.

6. The device of claim 1, wherein a geometric angle between the wall face and the bond interface has a value less than 90°.

7. The device of claim 6, wherein the angle has a value between 5° and 70°.

8. The device of claim 1, wherein the cavity protrudes between the wall face and a reference line perpendicular to the bond interface and passing through the terminus.

9. The device of claim 8, wherein the cavity also protrudes between the reference line and a wall face of the first layer proximate the bond interface and facing the cavity.

10. The device of claim 1, further comprising:

third layer means bonded to the second layer means along a second bond interface such that the second layer means is sandwiched between the first and third layers means.

11. The device of claim 10, wherein the second bond interface has a second terminus, and wherein, in a vicinity of the second bond interface, at least one layer means of the second and the third layer means define a wall having a wall width in the vicinity of the second bond interface that increases toward the second bond interface.

12. The device of claim 11, wherein the at least one layer means has a wall face proximate the second bond interface and bordering the cavity, and wherein the cavity protrudes between the wall face and a reference line perpendicular to the second bond interface and passing through the second terminus.

13. The device of claim 1, wherein the second layer means comprises a material selected from the group consisting of silicon, gallium arsenide, sapphire, ceramic, glass, and quartz.

14. The device of claim 1, further including:

a thin layer of material sandwiched between the first and second layer means.

15. The device of claim 1, further including a pressure-responsive device mechanically coupled at least in part to the second layer means.

16. The device of claim 15, further including measurement circuitry coupled to the pressure-responsive device to provide an indication of pressure.

17. A micromachined device having a cavity therein capable of being pressurized, the device comprising:

a plurality of layer means bonded together along at least one bond interface therebetween;

wherein, one of the plurality of layer means defines a pressure responsive diaphragm, and wherein for each bond interface that borders the cavity, at least one of the plurality of layer means is provided with means for reducing the stress magnitude at an edge of each such bond interface to permit the device to operate at an increased fluid pressure without fracturing.

18. The device of claim 17, wherein the device is at least a portion of a pressure transducer.

19. The device of claim 17, wherein the device comprises 2 layer means.

20. The device of claim 17, wherein the device comprises at least 3 layer means.

21. A micromachined device adapted to receive pressurized fluid, comprising:

first layer means; and second layer means bonded to the first layer means along a bond interface, the bond interface having a terminus;

wherein the device has a cavity to receive the pressurized fluid, wherein the second layer means has a wall face proximate the bond interface and bordering the cavity, wherein the cavity protrudes between the wall face and a reference line perpendicular to the bond interface and passing through the terminus, and wherein the cavity also protrudes between the reference line and a wall face of the first layer means proximate the bond interface and facing the cavity.

22. A micromachined device adapted to receive pressurized fluid, comprising:

first layer means;

second layer means bonded to the first layer means along a first bond interface, the first bond interface having a first terminus; and third layer means bonded to the second layer means along a second bond interface such that the second layer means is bonded between the first and third layer means;

wherein in the vicinity of the first bond interface, at least one of the first and second layer means defines a wall having a wall width in the vicinity of the first bond interface that increases toward the first bond interface;

wherein the second bond interface has a second terminus, wherein, in a vicinity of the second bond interface, at least one of the second and third layer means defines a wall having a wall width in the vicinity of the second bond interface that increases toward the second bond interface.

23. A micromachined device adapted to receive pressurized fluid, comprising:

first layer means;

second layer means bonded to the first layer means along a first bond interface, the first bond interface having a first terminus; and third layer means bonded to the second layer means along a second bond interface such that the second layer means is bonded between the first and third layers means;

wherein the device has a cavity to receive the pressurized fluid, wherein at least one of the first and second layer means has a wall face proximate the first bond interface and bordering the cavity, and wherein the cavity protrudes between the wall face and a first reference line perpendicular to the first bond interface and passing through the first terminus;

and wherein the second bond interface has a second terminus, wherein at least one of the second and third layer means has a wall face proximate the second bond interface and bordering the cavity, and wherein the cavity protrudes between the wall face and a second reference line perpendicular to the second bond interface and passing through the second terminus.

* * * * *

UNITED STATES PATENT AND TRADEMARK OFFICE
CERTIFICATE OF CORRECTION

PATENT NO. : 5,520,054
DATED : May 28, 1996
INVENTOR(S) : Romo

It is certified that error appears in the above-indentified patent and that said Letters Patent is hereby corrected as shown below:

Column 1, line 15, please delete "pan" and insert --part--.

Column 3, line 42, please delete "comer" and insert --corner--.

Column 3, line 49, please delete "comer" and insert --corner--.

Column 3, line 55, please delete "comer" and insert --corner--.

Column 4, line 18, please delete "et at." and insert --et al.--.

Column 4, line 21, please delete "at." and insert --al--.

UNITED STATES PATENT AND TRADEMARK OFFICE
CERTIFICATE OF CORRECTION

PATENT NO. : 5,520,054
DATED : May 28, 1996
INVENTOR(S) : Romo

It is certified that error appears in the above-indentified patent and that said Letters Patent is hereby corrected as shown below:

Column 5, line 40, please delete "attach" and insert --attacks--.

Signed and Sealed this

First Day of April, 1997

Attest:

BRUCE LEHMAN

Attesting Officer

Commissioner of Patents and Trademarks